(12) United States Patent
Fux et al.

(10) Patent No.: US 9,650,162 B2
(45) Date of Patent: May 16, 2017

(54) DEVICE FOR METERING BULK MATERIAL, IN PARTICULAR PLASTICS GRANULATE

(71) Applicant: WITTMANN KUNSTSTOFFGERAETE GMBH, Vienna (AT)

(72) Inventors: Erhardt Fux, Vienna (AT); Robbie J. Miller, Ontario (CA); Joseph Corturillo, Ontario (CA)

(73) Assignee: WITTMANN KUNSTSTOFFGERAETE GMBH, Vienna (AT)

( * ) Notice: Subject to any disclaimer, the term of this patent is extended or adjusted under 35 U.S.C. 154(b) by 0 days.

(21) Appl. No.: 14/435,072

(22) PCT Filed: Oct. 9, 2013

(86) PCT No.: PCT/AT2013/000167
§ 371 (c)(1),
(2) Date: Apr. 10, 2015

(87) PCT Pub. No.: WO2014/056010
PCT Pub. Date: Apr. 17, 2014

(65) Prior Publication Data
US 2015/0217878 A1    Aug. 6, 2015

(30) Foreign Application Priority Data
Oct. 11, 2012 (AT) .................................. A 1105/2012

(51) Int. Cl.
*B65B 1/32* (2006.01)
*B29B 7/60* (2006.01)
(Continued)

(52) U.S. Cl.
CPC ............ *B65B 1/32* (2013.01); *B01F 15/0445* (2013.01); *B29B 7/603* (2013.01); *B29B 9/00* (2013.01); *B65B 1/04* (2013.01)

(58) Field of Classification Search
CPC .. B65B 1/04; B65B 1/32; B29B 7/603; B29B 9/00; B01F 15/0445
(Continued)

(56) References Cited

U.S. PATENT DOCUMENTS

| 3,822,866 A | 7/1974 | Daester et al. |
| 5,855,232 A * | 1/1999 | Oda .......................... B65B 1/28 141/364 |

(Continued)

FOREIGN PATENT DOCUMENTS

| DE | 195 28 636 | 2/1997 |
| DE | 196 42 969 | 1/1998 |

(Continued)

OTHER PUBLICATIONS

Austrian Search Report conducted in counterpart Austrian Appln. No. A 1105/2012 (Apr. 3, 2013).
(Continued)

*Primary Examiner* — Nicolas A Arnett
(74) *Attorney, Agent, or Firm* — Greenblum & Bernstein, P.L.C.

(57) ABSTRACT

The invention relates to a device for metering bulk material, in particular plastics granulate, for machines processing plastics granulate, in particular for injection molding machines, wherein at least one material funnel (2) into which bulk material can be filled and which has a material valve is provided. A weighing container (4) connected to weighing scales is optionally arranged below the material valve. A control unit is provided for the weighing scales and material valves. The material valve is designed as a metering
(Continued)

valve (3), in particular as a flap-type metering valve. The metering valve (3) consists of a part, a closure (7), movable via a horizontal axis (6) and a fixed part, a scraper (8). The movable part has an operating arm (9) for an actuator (5) and at the end facing towards the fixed part has a closure plate (10) having a scraper projection (11). In the closed state of the metering valve (3) the scraper projection (11) touches the scraper (8).

17 Claims, 2 Drawing Sheets

(51) Int. Cl.
  *B01F 15/04* (2006.01)
  *B29B 9/00* (2006.01)
  *B65B 1/04* (2006.01)
(58) Field of Classification Search
  USPC .................................. 141/83, 192, 198, 392
  See application file for complete search history.

(56) References Cited

U.S. PATENT DOCUMENTS

| | | | |
|---|---|---|---|
| 6,007,236 | A | 12/1999 | MaGuire |
| 6,188,936 | B1 | 2/2001 | MaGuire |
| 6,402,363 | B1 | 6/2002 | MaGuire |
| 6,467,943 | B1 | 10/2002 | MaGuire |
| 6,720,393 | B1 * | 4/2004 | George ................... C08F 10/00 422/109 |
| 6,732,597 | B1 * | 5/2004 | Brandt, Jr. ................. G01F 1/30 73/861.73 |
| 8,562,204 | B2 * | 10/2013 | Konermann .............. B01F 5/24 366/141 |
| 2008/0049546 | A1 | 2/2008 | O'Callaghan |

FOREIGN PATENT DOCUMENTS

| | | |
|---|---|---|
| DE | 102 06 139 | 9/2002 |
| DE | 696 27 717 | 1/2004 |
| DE | 697 32 659 | 12/2005 |
| DE | 05 075 472 | 3/2006 |
| EP | 2 045 003 | 4/2009 |
| FR | 2 356 129 | 1/1978 |
| FR | 2 840 404 | 12/2003 |
| JP | S53 123461 | 10/1978 |
| WO | 87/05587 | 9/1987 |
| WO | 98/25695 | 6/1998 |
| WO | 2011/006906 | 1/2011 |

OTHER PUBLICATIONS

International Preliminary Report on Patentability, Forms PCT/IPEA/409; PCT/IPEA/416 (Jan. 23, 2015).

English language translation of Int'l. Prelim. Rpt. On Patentability, Forms PCT/IPEA/409; PCT/IPEA/416 (Jan. 23, 2015).

* cited by examiner

DEVICE FOR METERING BULK MATERIAL, IN PARTICULAR PLASTICS GRANULATE

CROSS-REFERENCE TO RELATED APPLICATIONS

The present application is a US National Stage Application of International Application No. PCT/AT2013/000167 filed Oct. 9, 2013 which published as WO 2014/056010 on Apr. 17, 2014. This application also claims the right of priority granted under 35 U.S.C. §§119 and 365 of Austrian Application No. A1105/2012 filed on Oct. 11, 2012.

BACKGROUND OF THE INVENTION

1. Field of the Invention

The invention relates to a device for metering bulk material, in particular plastics granulate, for machines processing plastics granulate, in particular for injection molding machines, wherein at least one material funnel into which bulk material can be filled and which has a material valve is provided and a weighing container connected to weighing scales is optionally arranged below the material valve, wherein a control unit is provided for the weighing scales and material valve.

2. Discussion of Background Information

A device of this type is known from U.S. Pat. No. 3,822,866 A, wherein a method for the provision of bulk material before metering is also described. The plastics granulate is provided by the delivery device in containers before metering.

A device for delivery and metering of bulk material is also known from DE 195 28 636 A1, wherein the metering device simultaneously serves as delivery device.

Furthermore, a device for delivery comprising multiple containers is known from US 2008/049546 A1.

In addition, a method and a gravimetric mixer for delivering measured quantities of granular materials and colorants, in particular pigments in liquid form, is known from DE 696 27 717 T2.

Furthermore, a gravimetric blender and hopper with integrated discharge valve for granular material is known from DE 05 075 472 T1.

Furthermore, a gravimetric mixer comprising a frame, a removable material storage funnel with a valve, a weighing container with weight detection and a mixing chamber below the weighing container is known from DE 697 32 659 T2.

As shown above, different amounts of different plastics granulate are introduced in batches according to freely adjustable formulations and each type of plastics granulate, such as for example new material, main batch, additives and/or material to be ground, is passed through a material funnel successively or also in parallel to a weighing container or mixing container, depending on the system, via a material valve.

In most cases, a formulation is used that includes the individual types of plastics granulate, such as for example new material, material to be ground, main batch and/or additives. Thereby, new material and material to be ground are in a weight-related disproportion to the main batch and additive. Thus, the proportions of new material and material to be ground can make up for approximately 70% and 30%, and main batch and/or additive amount to 1 to 2% in relation to the new material. A separate container is provided for each type of plastics granulate.

In order to be able to fulfill the standards above, material valves are required at the bottom end of the material funnels.

SUMMARY OF THE INVENTION

It is therefore the aim of the invention to create a device of the type mentioned above, which enables a high material throughput, on the one hand, as well as a metering of small quantities, on the other hand.

The invention is thus directed to a device for metering plastic granulate material for a machine that processes plastic granulate material. The device includes at least one material funnel configured to be filled with bulk plastic granulate material. A flap-type metering valve is movable between an open state and a closed state. The metering valve includes a fixed scraper and a movable closure configured to move relative to a horizontal axis. The movable closure includes an operating arm that is movable by an actuator and a closure plate having a scraper projection arranged on one end. The scraper projection contacts the fixed scraper when the metering valve is in the closed state. A weighing container is connected to weighing scales. A control unit is connected to the weighing scales and the metering valve.

The device in accordance with the invention is also characterized in that the material valve is designed as a metering valve, in particular as a flap-type metering valve, wherein said metering valve consists of a part, a closure, movable via a horizontal axis and a fixed part, a scraper, that the movable part has an operating arm for an actuator and at the end facing towards the fixed part has a closure plate having a scraper projection and that in the closed state of the metering valve the scraper projection touches the scraper. With the device in accordance with the invention, it is for the first time possible to achieve a most accurate metering of small quantities with a pulsed actuation of the flap-type metering valve and to achieve a high material throughput when the flap-type metering valve is actuated continuously or permanently. The resulting advantages are an extraordinarily high quality based on the most accurate metering of small quantities and a major time saving in the process step of metering based on the high material throughput. Another advantage must be seen in the fact that the structural design is extremely simple and practically maintenance-free. Furthermore, this design enables a flash-like closing effect of the valve.

The flap-type metering valve is also distinguished by its small dimensions in the metering device. The actuator unit, which serves for opening and closing the flap-type metering valve, is designed as a pneumatic cylinder and is mounted nearly vertically and in a space-saving manner to the device. Based on this arrangement, the handling is greatly simplified and does not demand any troublesome detachment of compressed air or cables when removed.

Another advantage of this device in accordance with the invention must be seen exactly in the flap-type metering valve. Wear-resistant stainless steel valves that operate so fast also permit an efficient metering of materials with a high share of glass fibers. Main materials and additives are metered accurately to the desired quantity.

In accordance with a special feature of the invention, the scraper is overlapped by the scraper projection in the closed state of the metering valve. The scraper projection overlaps the scraper when the flap-type metering valve is closed and prevents trailing of the material and achieves a precise metering of material as a result. It furthermore puts a stop to the trapping of individual or multiple material grains and prevents the uncontrolled leakage of material, which is necessary for an exact metering.

In accordance with another special feature of the invention, a spring is applied to the movable part, the closure, for automatic closure of the metering valve. An automatic closure of the flap-type metering valve simplifies the removal and handling of the filled funnels and prevents the leakage of material during the removal as a result. In accordance with an advantageous embodiment of the invention, the scraper projection is designed as bended edge or as rounded lip. As of the result of the quasi wider closing area that is achievable thereby, an optimal closing effect is given.

In accordance with another embodiment of the invention, the scraper is made of a flexible material, preferably spring steel. If one or more grains are trapped during closing, the spring scraper bounces off from the grains and the trapping or keeping open of the flap is resolved by itself.

In accordance with a special further embodiment of the invention, the closure plate is produced from a flexible material, preferably spring steel. By designing the closure plate with spring steel, the same effect is achieved as for the spring scraper.

In accordance with another special feature of the invention, the actuator for operating the operating arm is a pneumatic cylinder. Advantageously, pneumatic cylinders of this type work faultlessly and maintenance-free.

In accordance with a further embodiment of the invention, the actuator is arranged nearly vertically on the housing of the device. This way, the actuator is mounted to the device in a space-saving manner so that this results in smallest possible dimensions of the device. One of a customer's priority specifications is always a most minimal design of the device, thus a small floor space of the device, with a highest possible throughput of the device in operation. The small floor space is demanded because the device is optionally planned to be arranged on the machine, preferably the injection molding machine, as a slim body.

In accordance with another special feature of the invention, a control unit, preferably with a computer unit, in particular a microprocessor, is provided to operate the metering valve, in particular the flap-type metering valve, which can be supplied with at least one value, preferably a measured value, and the computer unit controls the metering valve accordingly.

In accordance with a further embodiment of the previous feature of the invention, the control unit comprises a computer unit, in particular a microprocessor, which is supplied with the measured value of the weighing scales and the computer unit, in which the metering quantity is stored, controls the metering valve, in particular the flap-type metering valve, according to said metering quantity. Based on a proprietary adaptive control algorithm, a precise metering is achieved with the control unit. Simplest operation is naturally a basic requirement for this control and a high efficiency is thus achieved. In addition, the RTLS technology (real time live scale technology) ensures a two-phase metering that becomes progressively more accurate for an exact target weight. It is needless to mention that this control unit comprises network capability with host computers, laptops and the like. The control unit itself consists of standard electric components which guarantee reliable operation and easy maintenance.

BRIEF DESCRIPTION OF THE DRAWINGS

The invention is explained in more detail on the basis of the embodiment illustrated in the figure, wherein.

DETAILED DESCRIPTION OF THE INVENTION

Figure 1:
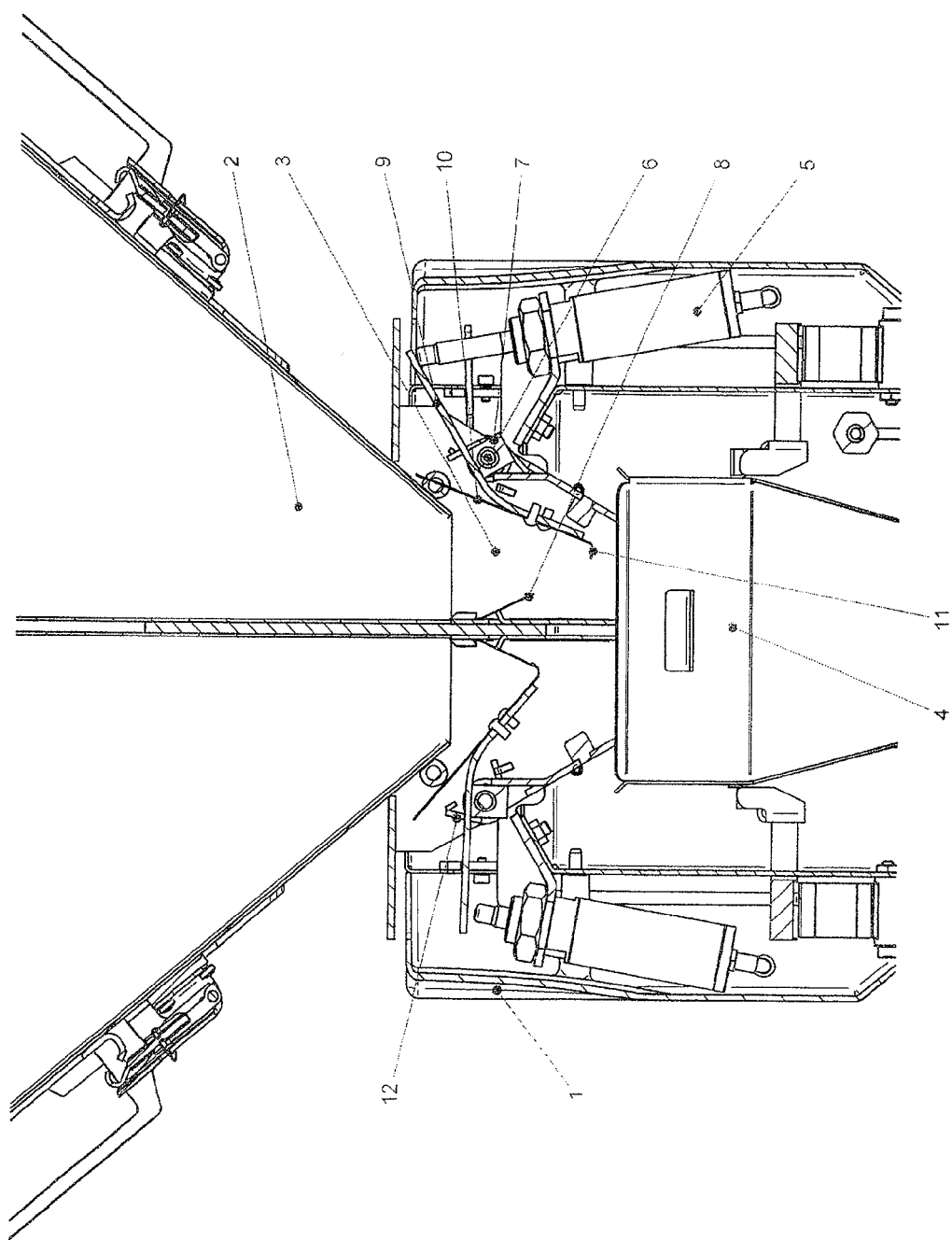
FIG. 1 shows a cross-section of the device in accordance with the invention.
Figure 2:
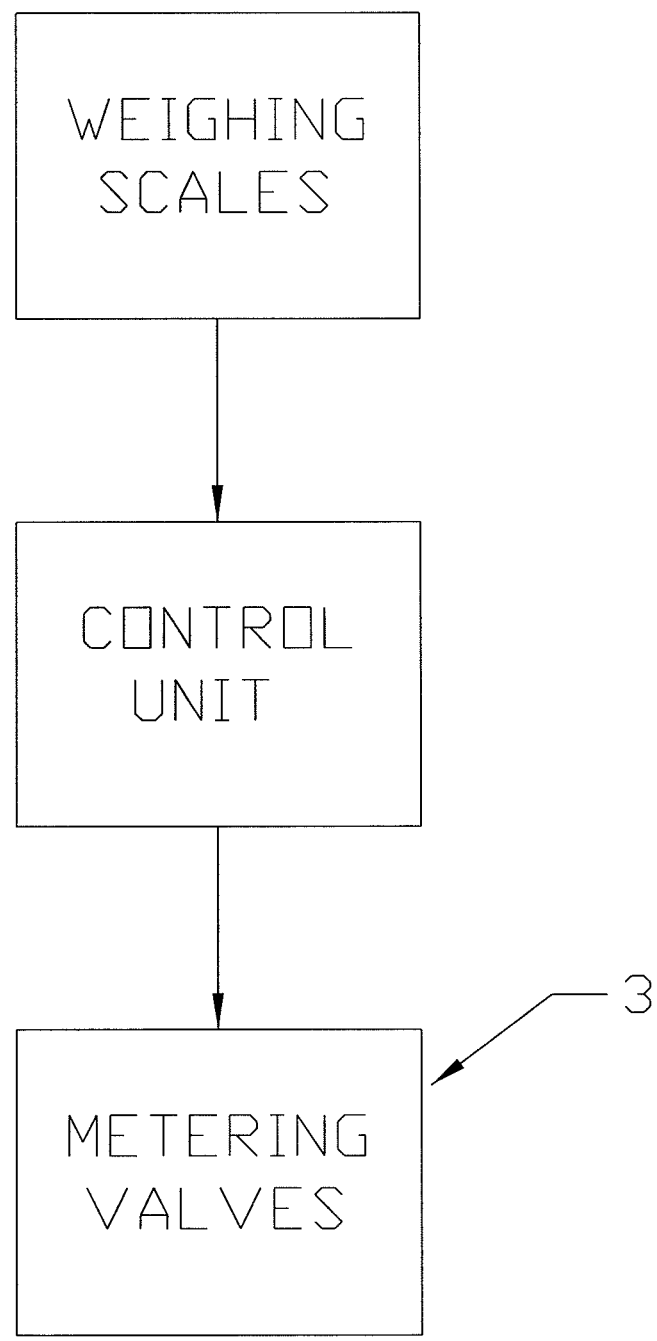
FIG. 2 schematically shows weighing scales coupled to a control unit and a control unit coupled to the one or more metering valves.

The device for metering bulk material, in particular plastics granulate, for machines processing plastics granulate, in particular for injection molding machines, has a modular design and consists of a housing 1 in which the components still described in more detail below are arranged and of removable or firmly mounted material funnels 2. A material funnel 2 with a metering valve 3 is provided for each type of plastics granulate. Naturally, the metering could also be carried out in parallel or sequentially, whereby in that case the plastics granulate is supplied in multiple funnels. The material funnels 2 can be closed through removable material funnel covers on the one hand and, in the covered state, comprise an assembly flange for the supply of the plastics granulate on the other hand. For easier handling, each material funnel 2 may comprise two handles. For convenient cleaning and also for visual check, each material funnel 2 may comprise a removable inspection glass. Furthermore, the material funnel 2 may consist of wear-resistant stainless steel and have quick-release closures for quick removal of the material funnels 2 from the housing 1.

A weighing container 4 connected to weighing scales is arranged below the metering valve 3. A platform load cell may be provided as weighing scales. The weighing scales are connected with the metering valve 3 through a control unit—not shown. Naturally, it also lies within the scope of the invention to equip a so-called "loss in weight" system, in which the storage quantity in the funnel, thus the loss quantity, is weighed every time, with the metering valve 3 operated by the actuator 5.

The metering valve 3 is designed as a self-closing metering valve 3, wherein the metering valve 3 is opened through an actuator 5, a pneumatic cylinder, preferably arranged on the housing 1.

In the metering device shown above, different amounts of different plastics granulate are introduced in batches according to freely adjustable formulations. Each individual type of plastics granulate, such as for example new material, main batch, additive and/or material to be ground, is successively passed through the metering valve 3 to a weighing container 4 from a material funnel 2, weighed in the weighing container 4 and the formulation is subsequently mixed in a mixer.

As already mentioned, new material and material to be ground are mostly in a weight-related disproportion to the main batch and additive. Thus, the proportions of new material and material to be ground can make up for approximately 70% and 30%, and main batch and/or additive amount to 1 to 2% in relation to the new material. Based on this fact, metering valves 3 are necessary which enable a high material throughput, on the one hand, as well as a metering of small quantities, on the other hand.

The metering valve 3 is designed as a flap-type metering valve, wherein said metering valve 3 consists of a part, a closure 7, movable via a horizontal axis 6 and a fixed part, a scraper 8. The movable part, thus the closure 7, has an operating arm 9 for an actuator 5 and at the end facing towards the fixed part, the scraper 8, has a closure plate 10 having a scraper projection 11. In the closed state of the metering valve 3 the scraper projection 11 touches the scraper 8. In preferred embodiments, the scraper projection 11 can overlap the scraper 8 in the closed state of the metering valve. The scraper projection 11 can be designed as bended edge or as rounded lip.

The scraper 8 and optionally also the closure plate 10 are made or produced from a flexible material, preferably steel spring. Naturally, stainless steel could also be used.

For an automatic closure of the metering valve 3, a spring 12 is applied to the closure 7.

As mentioned already, the weighing scales are connected with the metering valves 3 through a control unit or controller. The control unit comprises a computer unit, in particular a microprocessor, which is supplied with the measured value of the weighing scales. The formulation is stored in the computer unit, whereby the control unit controls the metering valves 3 accordingly and introduces the quantity of the individual types of plastics granulate.

As already shown, the significant advantage of this device is that most exact meterings are possible, which results in an immense increase of quality.

Supplementary to the device at issue, additional precision of the metering is achieved with the control unit by the control algorithm. In addition, the RTLS technology (real time live scale technology) ensures a two-phase metering that becomes progressively more accurate for an exact target weight.

The invention claimed is:

1. A device for metering plastic granulate material for a machine that processes plastic granulate material, said device comprising:
    at least one material funnel configured to be filled with bulk plastic granulate material;
    a flap-type metering valve movable between an open state and a closed state;
    said metering valve comprising:
        a fixed scraper;
        a movable closure configured to move relative to a horizontal axis and comprising:
            an operating arm that is movable by an actuator; and
            a closure plate having a scraper projection arranged on one end; and
            said scraper projection contacting the fixed scraper when the metering valve is in the closed state;
    a weighing container connected to weighing scales; and
    a control unit connected to the weighing scales and the metering valve.

2. The device of claim 1, wherein the machine that processes granulate plastic material is an injection molding machine.

3. The device of claim 1, wherein the weighing container is arranged below the metering valve.

4. The device of claim 1, wherein, in the closed state, the scraper projection overlaps the fixed scraper.

5. The device of claim 1, further comprising a spring configured to automatically close the flap-type metering valve.

6. The device of claim 1, further comprising a spring coupled to the closure.

7. The device of claim 1, wherein the scraper projection is a bent edge or a rounded lip.

8. The device of claim 1, wherein the fixed scraper comprises one of:
    a flexible material; and
    spring steel.

9. The device of claim 1, wherein the closure plate comprises one of:
    a flexible material; and
    spring steel.

10. The device of claim 1, further comprising the actuator, wherein the actuator is a pneumatic cylinder.

11. The device of claim 1, further comprising the actuator, wherein the actuator is arranged on a housing and is nearly vertically oriented.

12. The device of claim 1, wherein the control unit is configured to operate the flap-type metering valve and to be supplied with at least one measured value.

13. The device of claim 12, wherein the control unit comprises one of:
    a computer unit; and
    a microprocessor.

14. The device of claim 1, wherein the control unit comprises a computer unit with a microprocessor and:
    is supplied a measured value from the weighing scales;
    stores a metering quantity; and
    controls the flap-type metering valve based on said metering quantity.

15. The device of claim 1, wherein the metering valve is a self-closing flap-type metering valve.

16. A device for metering plastic granulate material for a plastic granulate processing machine, said device comprising:
    at least one material funnel configured to contain plastic granulate material;
    a flap-type metering valve arranged at a lower end of said material funnel and being capable of assuming an open state and a closed state;
    said metering valve comprising:
        a fixed scraper;
        a pivotally mounted closure comprising:
            an operating arm that is movable by an actuator; and
            a closure plate having a scraper projection arranged on one end; and
            said scraper projection contacting the fixed scraper when the metering valve is in the closed state;
    a weighing container connected to a weighing scale or load cell; and
    a control unit controlling the metering valve.

17. A device for metering plastic granulate material, said device comprising:
    at least one material funnel configured to contain plastic granulate material;
    a housing located below said material funnel;
    at least one actuator arranged on or in the housing;
    a self-closing flap-type metering valve capable of assuming an open state and a closed state;
    said metering valve being disposed on a lower end of the material funnel and comprising:
        a fixed scraper; and
        a pivotally mounted closure comprising:
            an operating arm that is movable by said actuator; and
            a closure plate having a scraper projection arranged on one end; and
            said scraper projection contacting the fixed scraper when the metering valve is in the closed state;
    a weighing container located below said metering valve; and
    a control unit controlling the metering valve.

* * * * *